United States Patent
Masghati et al.

(10) Patent No.: US 6,782,180 B2
(45) Date of Patent: Aug. 24, 2004

(54) REENTRANT ALIGNMENT FEATURES FOR OPTICAL COMPONENTS

(75) Inventors: Mona Masghati, Medford, MA (US); Livia M. Racz, Belmont, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/935,156

(22) Filed: Aug. 23, 2001

(65) Prior Publication Data

US 2002/0048446 A1 Apr. 25, 2002

Related U.S. Application Data

(63) Continuation-in-part of application No. 09/707,721, filed on Nov. 7, 2000, now abandoned, which is a continuation-in-part of application No. 09/648,348, filed on Aug. 25, 2000, now Pat. No. 6,625,372.

(51) Int. Cl.$^7$ ................................................. G02B 6/00
(52) U.S. Cl. ........................................ 385/134; 385/52
(58) Field of Search ................................ 385/134, 135, 385/136, 147, 52, 83, 131

(56) References Cited

U.S. PATENT DOCUMENTS

| | | | | |
|---|---|---|---|---|
| 4,691,586 A | * | 9/1987 | van Leijenhorst et al. | 74/490.09 |
| 5,611,008 A | * | 3/1997 | Yap | 385/14 |
| 6,074,103 A | * | 6/2000 | Hargreaves et al. | 385/90 |
| 6,266,196 B1 | * | 7/2001 | Do et al. | 359/819 |
| 6,393,685 B1 | * | 5/2002 | Collins | 29/416 |

FOREIGN PATENT DOCUMENTS

WO WO 91/060022 * 5/1991 ............ G02B/6/36

* cited by examiner

Primary Examiner—Tulsidas Patel
(74) Attorney, Agent, or Firm—J. Grant Hudson

(57) ABSTRACT

An optical component 100 adapted for attachment to an optical bench or submount has an alignment feature 310 that is used in the positioning of the optical component 100 relative to the optical bench. This alignment feature 310 is formed in an exterior wall 210 of the optical component. Further, according to the preferred embodiment, the alignment feature 310 has a re-entrant sidewall 320. This last characteristic facilitates the identification of precise location of the alignment by a vision system, for example, thus, allowing the accurate placement and installation of the optical component on the optical bench 10.

25 Claims, 9 Drawing Sheets

REENTRANT ALIGNMENT FEATURES FOR OPTICAL COMPONENTS

BACKGROUND OF THE INVENTION

Component alignment is of critical importance in fiber optic, semiconductor laser and/or MOEMS (micro-optical electromechanical systems) based system manufacture. The basic nature of light requires that light generating, transmitting, and modifying components must be positioned accurately with respect to one another, especially in the context of freespace-optical systems, in order to function properly and effectively in electro-optical or all optical systems. Scales characteristic of fiber optic, semiconductor laser, and MOEMS devices can necessitate micrometer to sub-micrometer alignment accuracy.

Consider the specific example of coupling light from a semiconductor diode laser, such as a pump or transmitter laser, into the core of a single mode fiber. Only the power that is coupled into the fiber core is usable. The coupling efficiency is highly dependent on accurate alignment between the laser output facet and the core; inaccurate alignment can result in partial or complete loss of signal transmission through the optical system.

Other more general examples include optical amplification, receiving and/or processing systems. Some alignment is typically required between an optical signal source, such as the fiber endface, and a detector. In more complex systems including tunable filters, for example, alignment is required not only to preserve signal power but also to yield high quality systems through the suppression of undesirable spatial optical modes within and without the systems.

Generally, the manufacture of high performance devices typically involves active alignment strategies. An optical signal is transmitted through the components and detected. The alignment is performed based on the transmission characteristics to enable the highest possible performance level for the system. Nonetheless, even with these techniques for active alignment, there is still the requirement that the optical components be first installed accurately and with precision relative to other components.

SUMMARY OF THE INVENTION

The general mechanism for precisely positioning these optical components on the optical submount or bench is to match alignment features on the optical components with alignment features on the optical benches. Older systems utilized the outer edges of the optical components as the alignment features. Typically, however, these outer edges are subject to variability due the manufacturing process and the subsequent handling of the components prior to installation. Moreover, the position of these outer edges relative to an optical axis, for example, can be highly variable if the optical components are coated with a material to enhance bonding, for example, prior to installation.

A parallel objective in optical system manufacture is to automate manufacturing processes. Modern precision placement machines such as flip-chip bonders typically have integrated vision systems that allow for the location of the bench/submount and component alignment features to automate the optical component installation process to some degree. These vision systems, however, are highly susceptible to spatial or surface noise that could give rise to ambiguity as to the precise location of the alignment features.

In general, according to one aspect, the invention concerns an optical component adapted for attachment to an optical bench or submount. The optical component has an alignment feature that is used in the positioning of the optical component relative to the optical bench. This alignment feature is formed in an exterior wall of the optical component. Further, according to the preferred embodiment, the alignment feature has a re-entrant sidewall. This last characteristic facilitates the identification of a precise location of the component by a vision system, for example, thus, allowing the accurate placement and installation of the optical component on the optical bench.

According to a current embodiment, the alignment feature is formed in a bottom face of the optical component. This configuration is appropriate for flip-chip bonders, providing bottom-to-top alignment. In other implementations, the features can be located on a top face in the case of top-to-top alignment.

Moreover, according to a preferred embodiment, a proximal origin of the exterior wall surrounding the alignment feature is depressed relative to an outer exterior wall. Specifically, a proximal origin of the reentrant sidewall is depressed relative to the exterior wall surrounding the alignment feature. This aspect of the preferred embodiment is particularly helpful since it is this proximal origin of the reentrant sidewall that is used as the focal plane for the vision system. Since the origin is depressed relative to the surrounding walls, there is an opportunity to defocus the adjacent exterior wall. This defocusing removes a major source of noise to the vision system, which are the grain boundaries in the bulk material of the component, when made of metal, for example, or surface roughness generally.

It is not uncommon for these optical components, especially when they are manufactured using lithographic and plating processes, to have relatively large grain sizes, on the order of 10–100 micrometers, relative to the overall size of the component, e.g., 100–2000 micrometers, and the desired placement tolerances of 1 to 20 micrometers. Grain boundaries can be further decorated, or highlighted, in plating processes preceding the installation. According to the present invention, however, such grain boundaries or surface roughness can be defocused allowing a vision system to more accurately identify or locate the alignment features.

In one implementation, the exterior wall surrounding the alignment feature is bonded to the optical bench. In another implementation, however, this exterior wall is depressed relative to a surface that forms the bonding surface.

In the current implementation, the alignment feature comprises a slot that extends along the length of the optical component. Particularly, the slot typically extends along an entire length of the optical component.

In the preferred embodiment, the bonding process is compatible with carrier-class optical equipment. Thus, the optical components are preferably solder bonded to the optical bench. As such, they are preferably coated with, for example, a gold or gold alloy, to a thickness of between 0.5 and 4 micrometers. Currently, they are plated to about 1.25 micrometers thick. Such coatings can be either sputtered or plated onto the optical component.

Further, according to the invention, multiple alignment features are spaced along the width of the optical component. Preferably, these alignment features have different widths relative to each other such that the particular alignment feature's location on the optical component can be determined by reference to the alignment feature's width. In the current implementation, the optical alignment features of the optical components are used to place the optical components on the bench. Presently, they are placed on the bench with an accuracy of better than 10 micrometers in the preferred embodiment. Particularly, when the placement processes have been optimized, placement accuracies of better than one to two micrometers are attainable.

As such, the alignment features are relatively small. Presently, they are between 10 and 100 micrometers wide. If they are not plated or otherwise coated, however, relatively smaller alignment features of less than 50 micrometers can be used. Presently, the alignment features have waists of about 25 micrometers when no plating is used, whereas waists of about 50 micrometers are used in conjunction with alignment feature coating.

In general, according to another aspect, the alignment features comprise two opposed reentrant sidewalls. This configuration in one implementation results in a frusto-triangular profile. In another implementation, an hourglass profile is used. In each case, the waist, or narrowest portion between the sidewalls, of the alignment features is generally between 10 and 100 micrometers.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
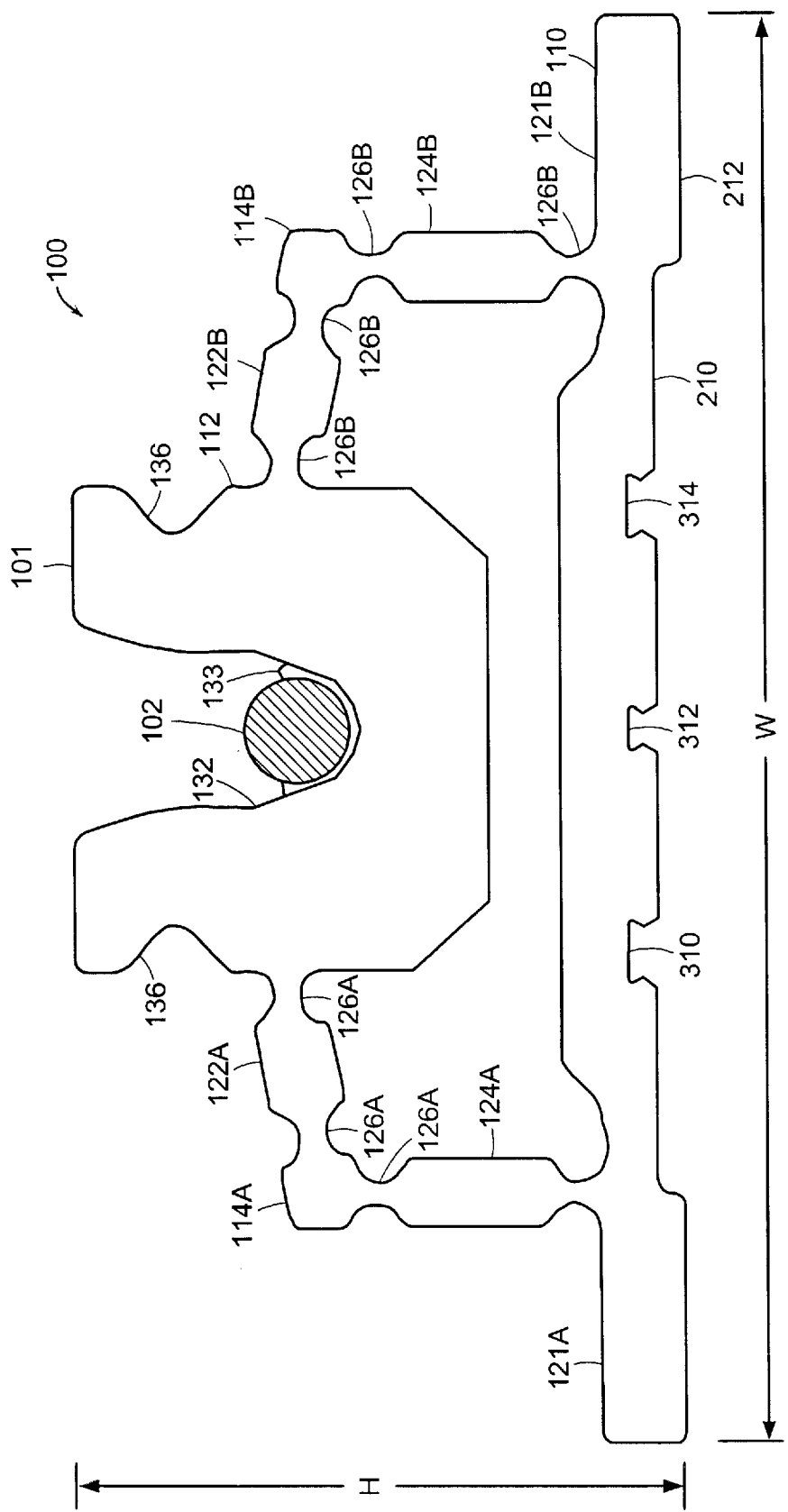
FIG. 1 is a front plan view of an optical component with alignment features of the present invention.

FIG. 1 shows an exemplary optical component 100. Generally, the optical component comprises a mounting structure 101 and an optical element 102, which is an optical fiber in the illustrated example.

In other implementations, the optical component comprises a monolithically formed element and structure.

The illustrated mounting structure 101 comprises a base 110, an optical element interface 112, and left and right armatures 114A, 114B, which either directly connect, or indirectly connect, the base 110 to the interface 112.

In the illustrated implementation, each of the armatures 114A, 114B comprises two segments 122 and 124. Specifically, and for example, armature 114B comprises two segments, 122B and 124B. Each segment includes flexures 126A, 126B along their length, in the illustrated embodiment. These flexures are regions of reduced cross-sectional area in the segments, which regions extend along the length of the structure. This configuration is used when post-installation plastic deformation is used to align the optical system.

In one implementation, the optical element 102 is bonded via bonding material 133 to the optical element interface 112, and specifically bonding surface 132. This bonding is accomplished either through polymeric adhesive bonding or preferably solder bonding. In other implementations, thermocompression bonding, laser welding, reactive bonding or other bonding methods are used.

The optical element interface, in some other implementations, comprises a closed, rather than slot-shaped, port enabling an optical signal to pass transversely through the structure 101. This enables optical access to the optical element by either facilitating the propagation of an optical signal to and/or away from the element.

To facilitate the grasping and placement of the component 100, a handle 136 is also preferably provided on the structure 101. In the illustrated embodiment, the handle 136 comprises two V- or U-shaped cut out regions on either side, near the top of the top of the structure. In the illustrated example, they are integral with the optical component interface 112.

The handle 136 enables the manipulation of the structure 101, when attached to the bench 10. Specifically, the right cut-out is engaged to displace the interface to the left, for example. To displace the interface vertically or in the y-axis direction, both cutouts of the handle 136 are engaged enabling the interface of the structure to be pressed down toward the bench 10 or pulled away from the bench 10.

To further facilitate grasping and installation on the bench, wing portions 121A, 121B are provided on the base 110 in the illustrated implementation. These are used by a heated vacuum chuck of a flip-chip bonder, for example, to enable placement of the structure and subsequent heating for solder bonding. The short distance between the wings 121 and the base surface 212 facilitate good heat transfer.

The base 110 of the optical component 100 generally comprises a laterally-extending base or bonding surface 212 and an exterior wall 210 that borders each of three alignment features 310, 312, 314 formed in a recessed portion. This exterior wall 210 is depressed relative to the outer exterior wall or bonding surface 212, in a current embodiment. In the typical implementation, the outer exterior wall 212 is mated or contacted to the optical bench.

Generally, in the typical implementation, the height (h) of the optical component 100 is less than 3 millimeters. Typically, a height (h) of less than 1200 to 1000 $\mu$m is common. The width (w) is typically less than 4 mm. Presently, the width is less than 2,500 $\mu$m.

Figure 2:
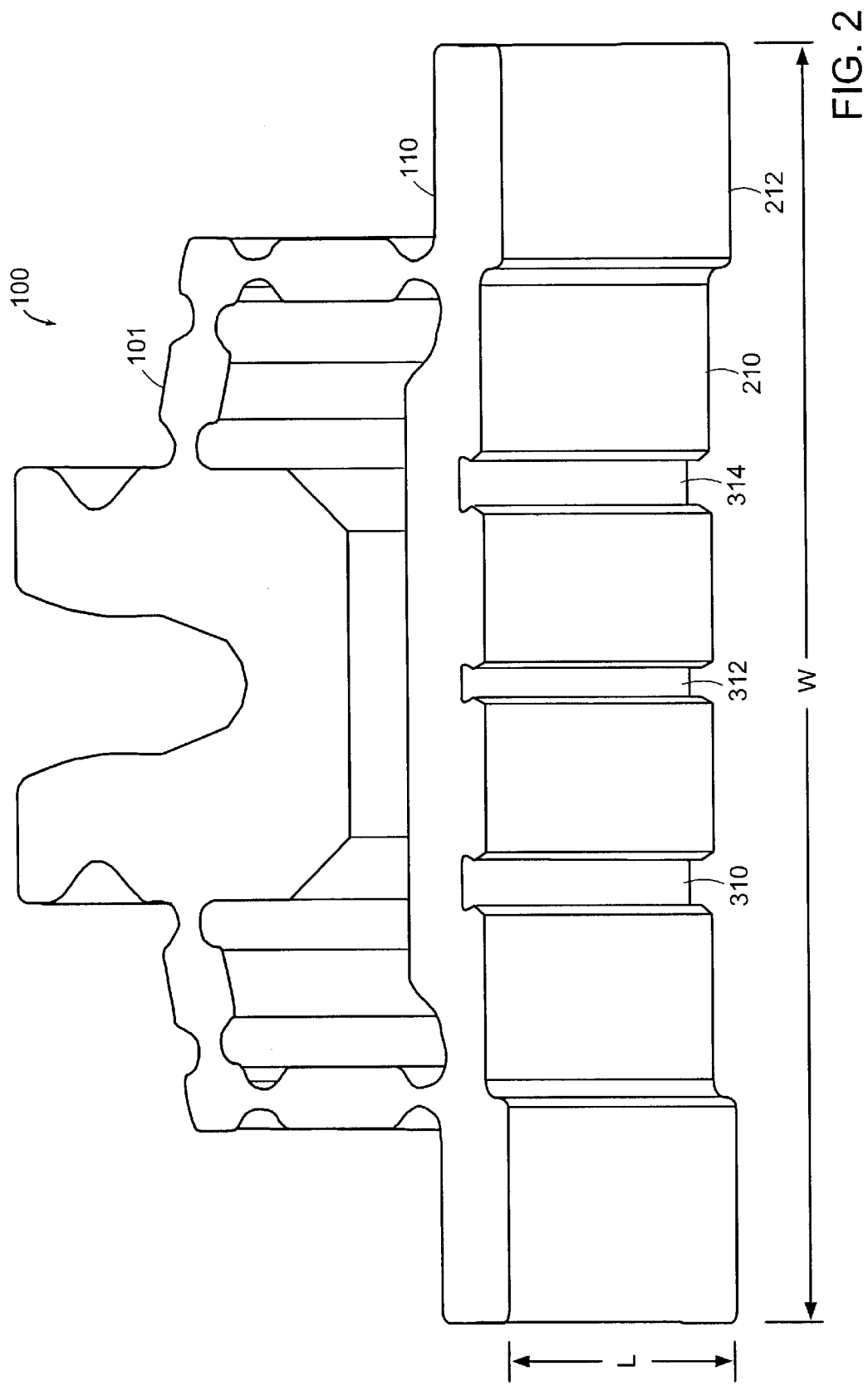
FIG. 2 is a perspective view of the optical component showing the extent of the inventive alignment features across a bottom face of the component.

FIG. 2 shows the entire extent of the alignment features 310, 312, 314, across the entire length (L) of the optical component 100. In one implementation, the optical component 100 is manufactured using an x-ray lithography process in which the form or mold for the optical component is etched into PMMA. Thereafter, the patterned PMMA is filled with bulk material in an electroforming process. As a result, the mounting structures 101 of the optical components 100 have a relatively constant cross-section as formed using the lithography process. This, the alignment features 310–314 extend along the entire length (L) of the optical components since this photolithographic process yields a relatively cross-sectionally constant device.

Figure 3:
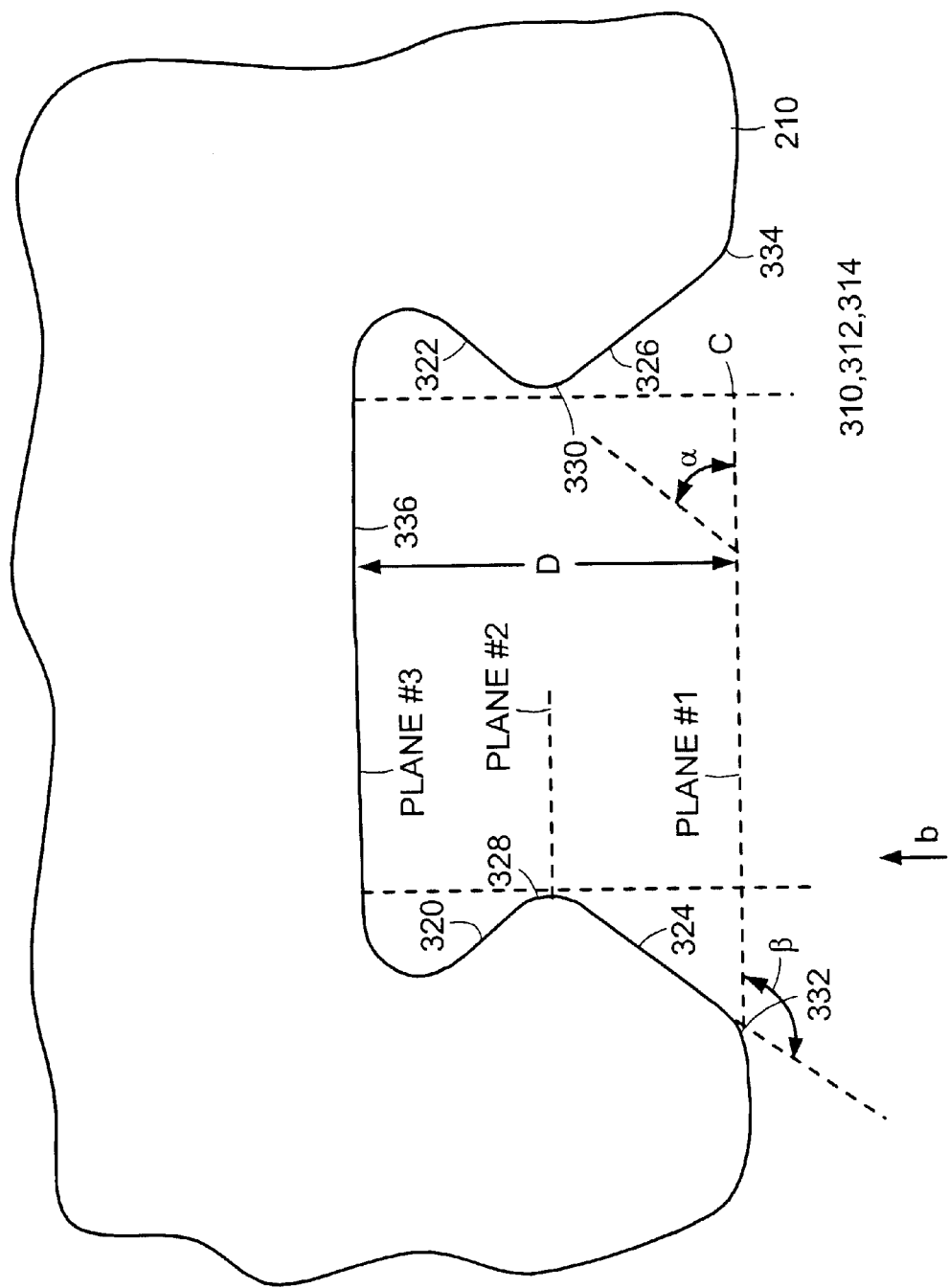
FIG. 3 is a close-up elevation view of one of the inventive alignment features.

FIG. 3 is a close-up view of the one of the alignment features 310, 312, 314. Specifically, the alignment feature comprises left and right reentrant sidewalls 320, 322. These sidewalls are reentrant in the sense that they have an internal angle $\alpha$ of less than 90° with the plane of the exterior wall 210. Preferably, the internal angle is between 30 and 60°. Presently, the angle $\alpha$ is about 45°.

The configuration of the alignment feature, however, further comprises sloping left and right sidewalls 324, 326. These sidewalls 324, 326 slope in toward the structure's interior with internal angles $\beta$ that are greater than 90° relative with the external wall 210. This yields an alignment feature with a cross-sectional profile that is generally hourglass in shape.

Figure 4:
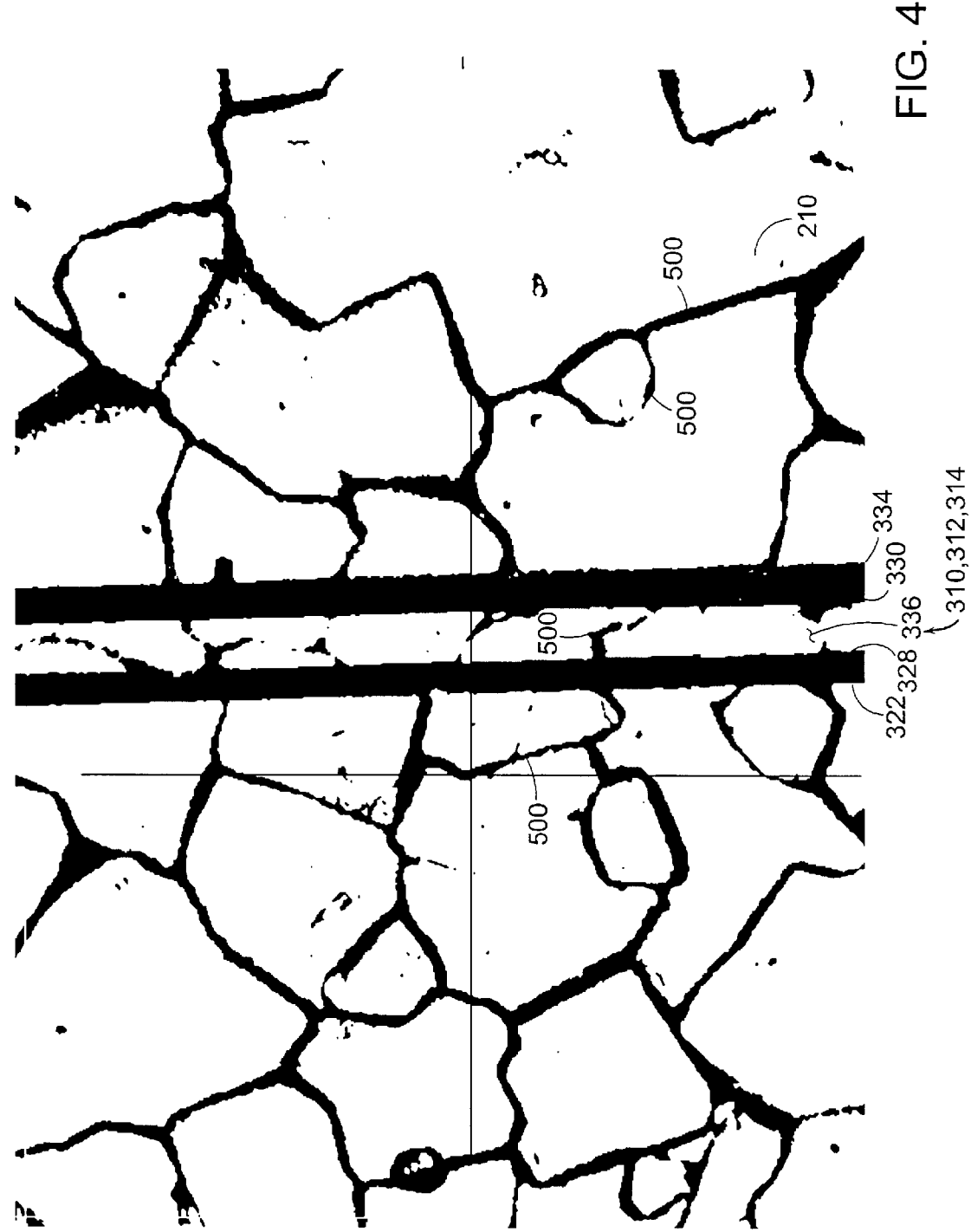
FIG. 4 is an image showing a bottom face of an optical component and the grain boundaries in the component bulk material.
Figure 5:
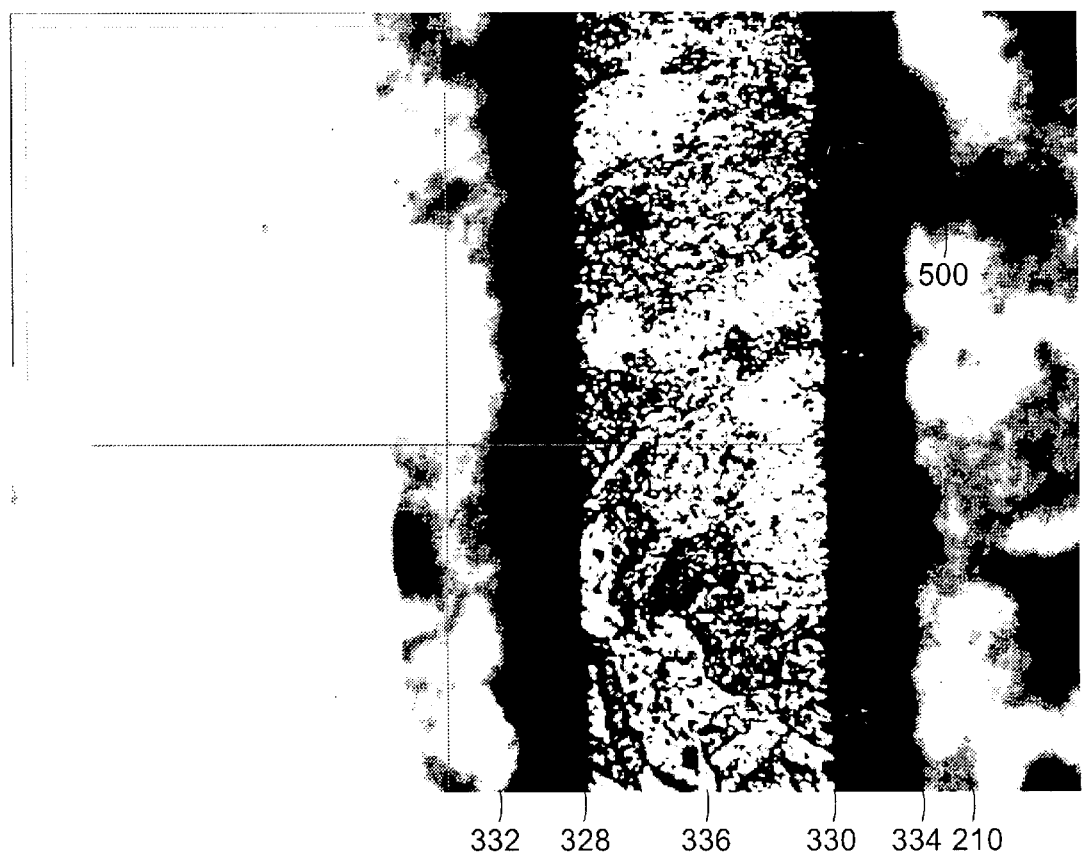
FIG. 5 is an image showing the bottom face using a defocusing technique to reduce noise in the vision system from grain boundaries.

The advantage of this reentrant sidewall configuration and specifically, the hourglass profile of FIG. 3 can be understood by observation and comparison of FIGS. 4 and 5 with reference to FIG. 3.

Referring first to FIG. 3, a vision system looking at the alignment mark from the direction of arrow b has three distinct focal planes on which it can focus. Specifically, there is plane 1, which coincides with the exterior surface 210. Plane 2 coincides with the proximal origins 328, 330 of the left and right reentrant sidewalls 320, 322, or the waist of the hourglass. Finally, the focal plane 3 coincides with the bottom of the alignment mark.

FIG. 4 is an image taken of an alignment feature with similar features having similar reference numerals. In this image, all three planes, plane 1, plane 2, and plane 3, are in focus. The intent of this drawing is to illustrate that the grain boundaries 500 in the bulk material of the optical component obscure to the vision system the specific location of the alignment feature 310, 312, 314. This prevents the location of the alignment features by the vision system. In one instance, this can lead to some inaccuracies in the device's installation. In the worst case, the vision system can confuse a grain boundary for an alignment feature.

FIG. 5 illustrates the inventive defocusing technique that utilizes the profile of the alignment features 310, 312, 314, to facilitate vision system placement of the optical components. Specifically, the plane 1, corresponding to the exterior face 210 and plane 3 corresponding to the base of the alignment mark are intentionally defocused. This yields "soft" edged grain boundaries 500 and relatively soft edges at the origins 332, 334 of the sloping sidewalls 324, 326. The vision system, however, is focused on plane 2 corresponding to the origins of the origins 328, 330 of the reentrant sidewalls 320, 322. Further, since the sidewalls are reentrant, rather than, for example, orthogonal to the exterior face 210, they present an unambiguous edge for the vision system to locate. Further, this is the only "hard" edge that the vision system sees. As a result, the vision system can, with high accuracy, locate specific parts of the alignment features to enable the accurate placement of the optical components on the optical bench.

Figure 6:
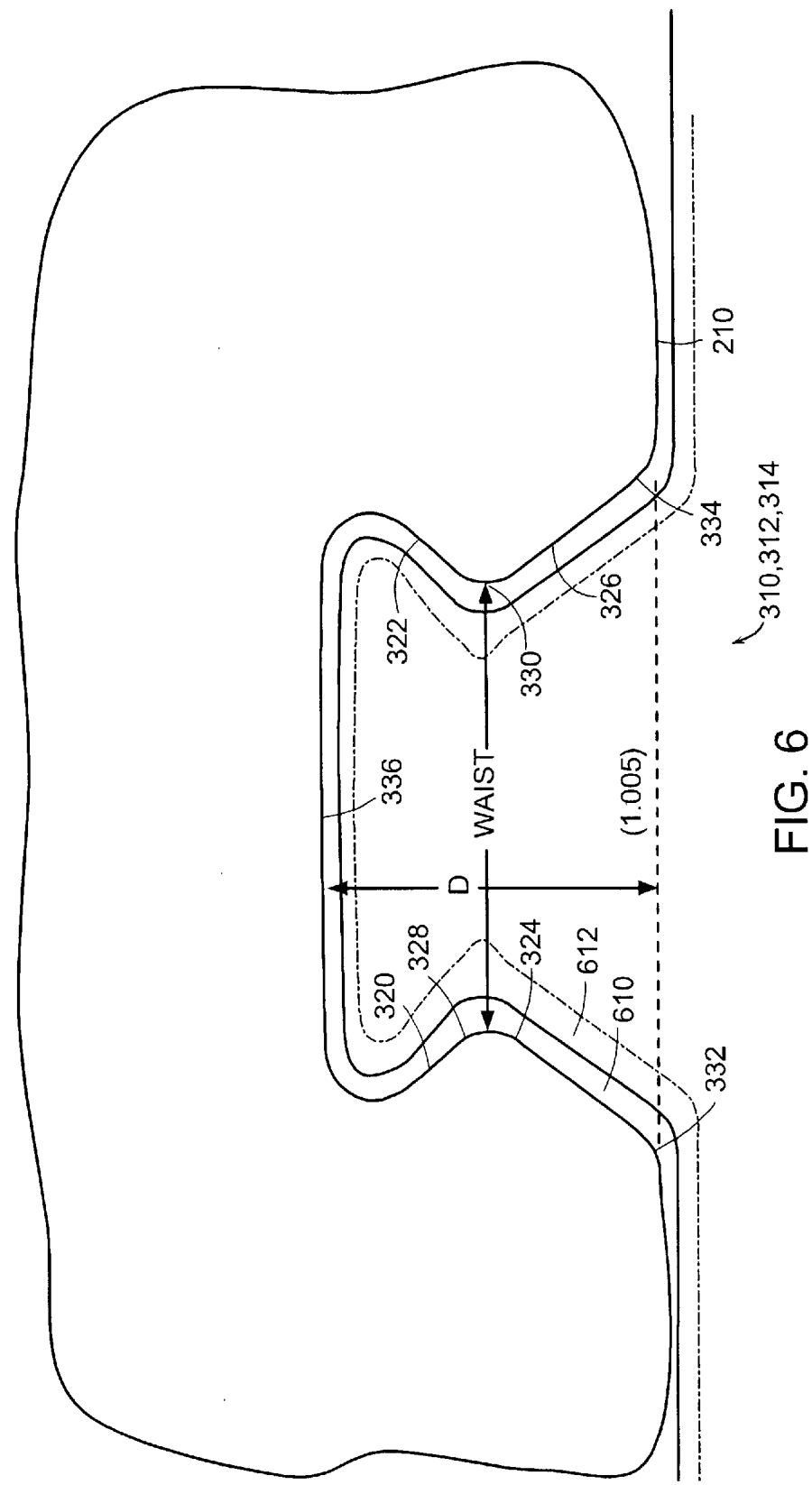
FIG. 6 is a plan view of the inventive alignment feature illustrating the effect of gold plating.

FIG. 6 illustrates the coating of the alignment feature 310, 312, 314, which coating is typically performed as a precursor or preliminary step to installation of the optical component 100 on an optical bench.

Specifically, in one implementation, the optical component 100 is solder bonded to the optical bench. Such solder bonding is common in carrier-class optical systems because of its long-term stability and because it represents a relatively "clean" bonding process in which little or no organics are introduced into the typically hermetically sealed optical system.

Typically, the solder coatings of gold or 73Au27Sn to 80Au20Sn (weight percent) gold alloys are used. Currently, the thickness of these gold/gold alloy coat 610 is between 0.5 and 2 micrometers in the region of the external surface 210. In some cases, gold alloy solders 612 are further added, which have thicknesses of 3–10 micrometers.

One issue that arises, however, is the fact that gold plating or gold coating is a non-conformal process. Specifically, the thickness of the plating tends to vary depending on the underlying angular characteristics of the surface onto which it is being coated due to the current densities resulting from the surrounding electric fields during the plating process. Specifically, a relatively thick portion of gold typically forms on the waist of the 328, 330 of the hourglass profile alignment features. Typically, less gold forms deep in the corners where there is less exposure to the coating processes. These variables associated with the coating or plating process yield ranges for the waist distance. When coatings are not going to be placed over the alignment features, typically, the size of the waist is between 10 and 50 micrometers with waists of about 25 micrometers being preferred. In contrast, however, when the alignment features 310, 312, 314 are going to be exposed to a solder coating, e.g., sputtering or plating process, relatively longer waists of between 20 and 100 micrometers are preferred with current coating-compatible waist sizes of around 50 micrometers being used.

Figure 7:
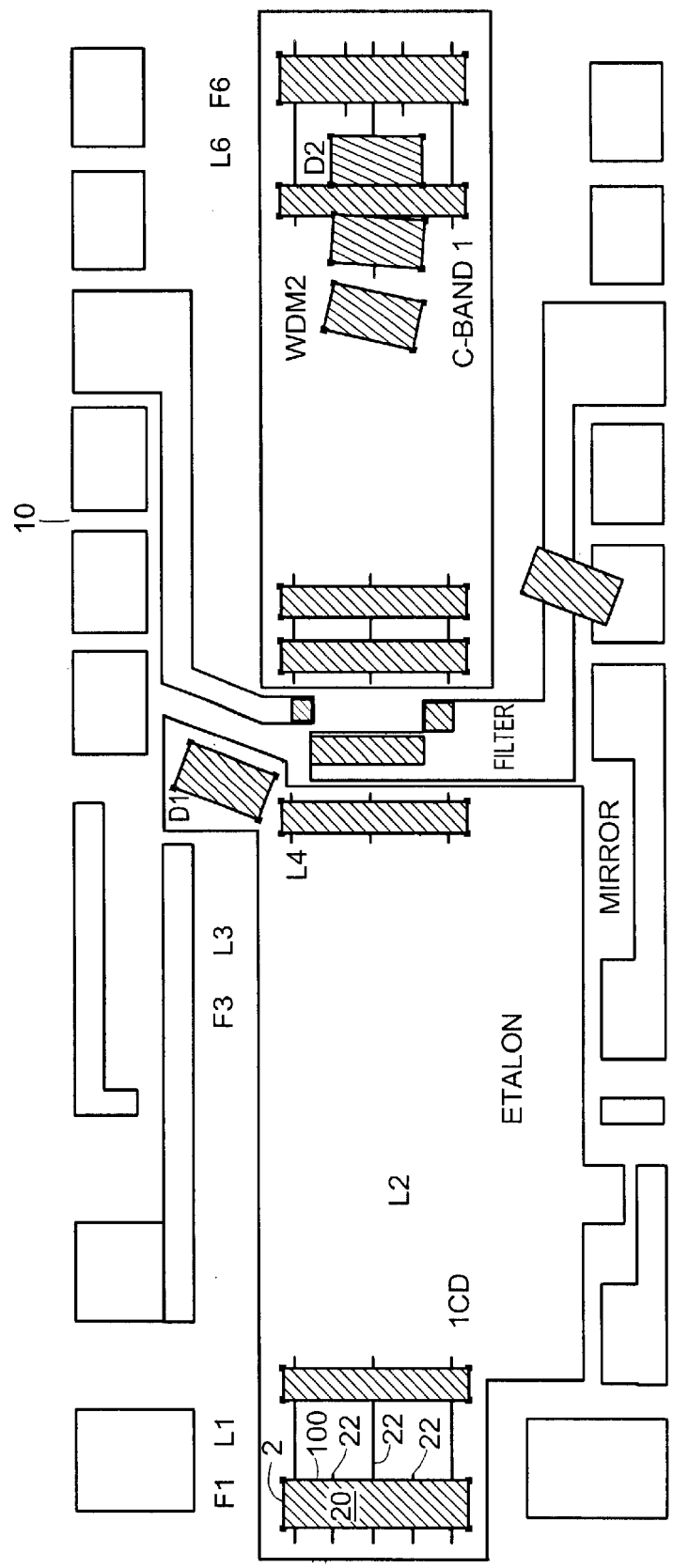
FIG. 7 is a plan view of an optical bench showing bench alignment features.

FIG. 7 illustrates an exemplary optical bench 10 that is compatible with the optical components 100 described herein. Specifically, the illustrated bench is used in the manufacture of an optical channel monitoring system. Specifically, an optical component 100 that is used, for example, in installing a fiber to the optical bench would be located in the region of the mark 20. Bench alignment features 22 are used to precisely locate the bench 10 by the vision system for installation of the optical component.

Figure 8:
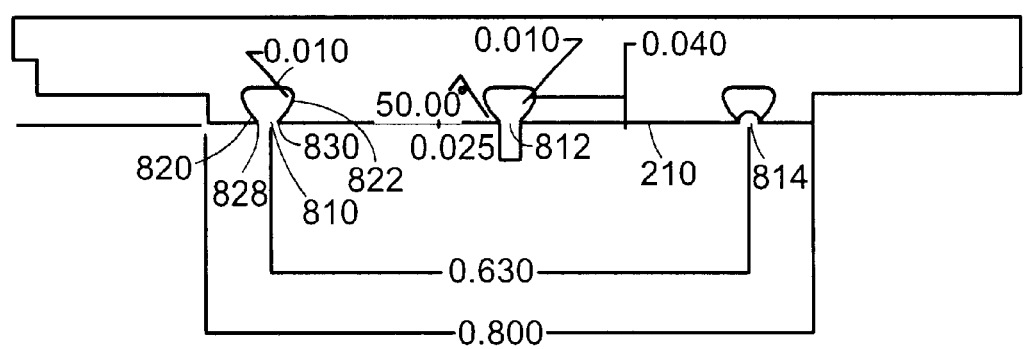
FIG. 8 is a partial elevation view of another alignment feature profile according to the invention.
Figure 9:
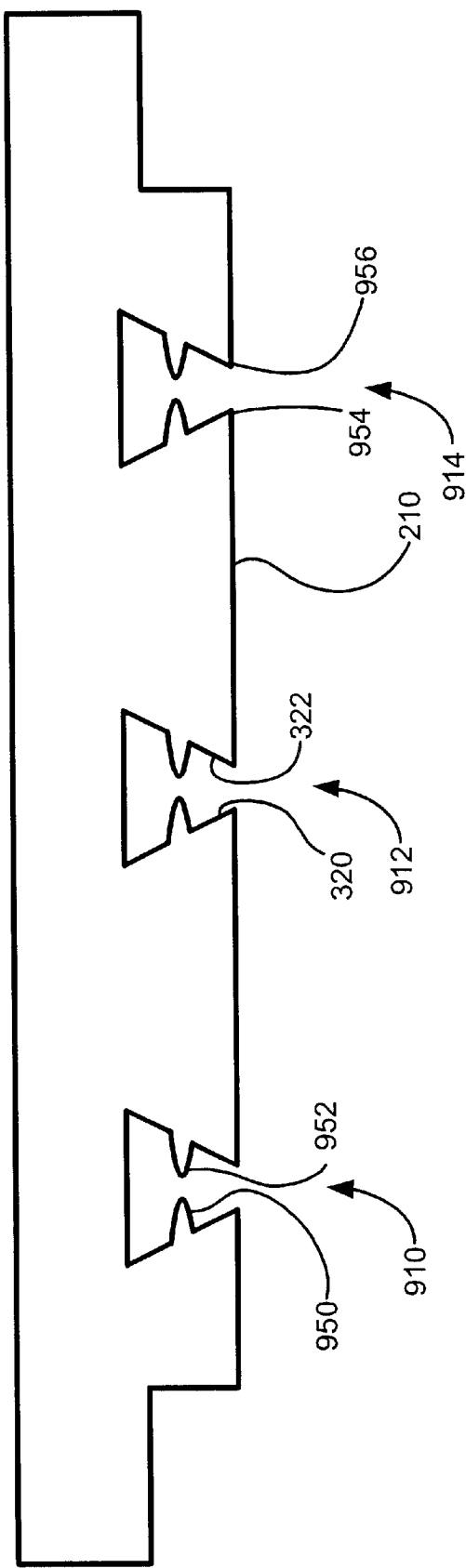
FIG. 9 is a partial elevation view of still another alignment feature profile according to the invention.

FIG. 8 illustrates another embodiment of the alignment features. Specifically, three alignment features 810, 812, 814 are shown. These alignment features have a frusto-triangular profile. Of note, in these profiles, is the fact that the origins 828, 830 of the reentrant sidewalls 820, 822 lie in the same plane as the exterior surface 210. Further, this exterior surface is not depressed, and thus would be directly bonded to an optical bench 10. Alignment feature 814 shows the profile changes due to coating FIG. 9 shows still another embodiment of the reentrant sidewall alignment marks of the present invention. Specifically, these alignment features 910, 912, 914 include projecting tabs 950, 952. As a result, they essentially divide the reentrant sidewalls into inner and outer reentrant sidewalls. The inner reentrant sidewalls extend along the inner sides of the tabs to the tips of tabs 950, 952. This results in multiple clearly defined edges for a vision system.

Specifically, in the embodiments illustrated in FIG. 9, the vision system can either focus on the tips of the projecting tabs 950, 952 or the intersections 954, 956 between the outer left and right reentrant sidewalls 320, 322 and the outer surface 210.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical component adapted for attachment to an optical bench, the optical component comprising:

an alignment feature for positioning the optical component relative to the optical bench, wherein the alignment feature extends into the optical component from an exterior wall, the alignment feature comprising a reentrant sidewall; and a coating over the optical component that is used to attach the optical component to the optical bench, the coating being plated on the optical component.

2. An optical component as claimed in claim 1, wherein the alignment feature is formed in a bottom face of the optical component.

3. An optical component as claimed in claim 1, wherein a proximal origin of the reentrant sidewall is depressed relative to the exterior wall surrounding the alignment feature.

4. An optical component as claimed in claim 3, wherein the outer exterior wall is bonded to the optical bench.

5. An optical component as claimed in claim 1, wherein the exterior wall surrounding the alignment feature is bonded to the optical bench.

6. An optical component as claimed in claim 1, wherein the exterior wall is depressed relative a surface that is bonded to the optical bench.

7. An optical component as claimed in claim 1, wherein the alignment feature comprises a slot that extends along a length of the optical component.

8. An optical component as claimed in claim 1, wherein the alignment feature comprises a slot that extends along an entire length of the optical component.

9. An optical component as claimed in claim 1, wherein the coating is between 0.5 and 10 micrometers thick.

10. An optical component as claimed in claim 1, wherein the coating is about 3 micrometers thick.

11. An optical component as claimed in claim 1, further comprising a gold plated layer on the optical component over the alignment feature.

12. An optical component as claimed in claim 1, further comprising multiple alignment features spaced from each other along a width of the optical component.

13. An optical component as claimed in claim 12, further comprising at least two of the alignment features having different widths with respect to each other.

14. An optical component as claimed in claim 1, wherein a waist of the alignment feature is between 10 and 100 micrometers wide.

15. An optical component as claimed in claim 1, wherein a waist of the alignment feature is between 10 and 50 micrometers wide.

16. An optical component as claimed in claim 1, wherein a waist of the alignment feature is about 25 micrometers wide.

17. An optical component as claimed in claim 1, wherein a waist of the alignment feature is about 50 micrometers wide.

18. An optical component as claimed in claim 1, further comprising a gold alloy coating on the optical component over the alignment feature for attaching the optical component to the optical bench.

19. An optical component adapted for precision attachment to an optical bench, the optical component comprising:

an alignment feature for positioning the optical component relative to the optical bench, wherein the alignment feature extends into the optical component from an exterior wall, the alignment feature comprising two opposed reentrant sidewalls; and a coating over the optical component that is used to attach the optical component to the optical bench, the coating being plated on the optical component.

20. An optical component as claimed in claim 19, wherein the alignment feature has a frusto-triangular profile.

21. An optical component as claimed in claim 20, wherein a waist of the alignment feature is between 10 and 100 micrometers wide.

22. An optical component as claimed in claim 20, wherein a waist of the alignment feature is between 10 and 50 micrometers wide.

23. An optical component as claimed in claim 19, wherein the alignment feature has an hourglass profile.

24. An optical component as claimed in claim 23, wherein a waist of the alignment feature is between 10 and 100 micrometers wide.

25. An optical component as claimed in claim 23, wherein a waist of the alignment feature is between 10 and 50 micrometers wide.

\* \* \* \* \*